(12) United States Patent
Johnson

(10) Patent No.: US 10,054,216 B2
(45) Date of Patent: Aug. 21, 2018

(54) ASSEMBLY GUIDE FOR SLEEVED PLANETARY CARRIERS

(71) Applicant: Caterpillar Inc., Peoria, IL (US)

(72) Inventor: John Al Johnson, Dilworth, MN (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/220,115

(22) Filed: Jul. 26, 2016

(65) Prior Publication Data
US 2018/0031116 A1 Feb. 1, 2018

(51) Int. Cl.
*F16H 57/08* (2006.01)
*F16H 57/00* (2012.01)
*F16H 57/02* (2012.01)

(52) U.S. Cl.
CPC ... *F16H 57/082* (2013.01); *F16H 2057/0062* (2013.01); *F16H 2057/02021* (2013.01); *F16H 2057/085* (2013.01)

(58) Field of Classification Search
CPC ........... F16H 57/082; F16H 2057/0062; F16H 2057/085
See application file for complete search history.

(56) References Cited

U.S. PATENT DOCUMENTS

| 5,643,126 A * | 7/1997 | Hotta .................. F16H 57/0479 184/6.12 |
| 9,657,812 B2 * | 5/2017 | Caiazzo ................ F16H 1/2836 |
| 2003/0236148 A1* | 12/2003 | Fox ........................ F16C 19/386 475/348 |
| 2006/0142114 A1* | 6/2006 | Fox ........................ F16H 1/2836 475/348 |
| 2014/0080658 A1* | 3/2014 | Edelmann ............... F16C 25/06 475/331 |
| 2015/0105212 A1 | 4/2015 | Graham et al. |

FOREIGN PATENT DOCUMENTS

| DE | 102012202450 | 8/2013 |
| DE | 102013222731 | 5/2015 |

* cited by examiner

*Primary Examiner* — David J Hlavka
(74) *Attorney, Agent, or Firm* — Law Office of Kurt J. Fugman LLC

(57) ABSTRACT

A method for assembling a carrier subassembly for use with a planetary gear train comprises inserting a gear so that the bore of the gear surrounds the bore of the carrier member, and aligning an assembly guide having a bore by engaging a portion of the assembly guide with an alignment feature of the carrier subassembly such that the bore of the assembly guide is aligned with the bore of the carrier member.

9 Claims, 8 Drawing Sheets

US 10,054,216 B2

ASSEMBLY GUIDE FOR SLEEVED PLANETARY CARRIERS

TECHNICAL FIELD

The present disclosure relates to planetary gear trains and methods for assembling such planetary gear trains. More particularly, the present disclosure is related to a planetary gear train that employs a sleeve for replacing worn out surfaces of planetary gear train carrier and a guide for assembling the shaft for connecting a planetary gear to the carrier.

BACKGROUND

Many machines use planetary gear trains as part of their transmission or for other purposes. These gear trains or gear assemblies often include a carrier subassembly to which various components are attached such as the carrier, planetary axle, planetary gear and bearings. The inner cylindrical surfaces of the bores as well as the annular shaped thrust surface that surrounds the perimeter of some bores need to be tightly toleranced to provide the precision and support for the gear train to work properly. An interference fit is often providing between the inner surface of a bore and various components such as the planetary axle. Over time in operation, these surfaces may wear resulting in a loss of the capacity of the joint to work properly, requiring machine maintenance.

Furthermore, it is important that the gear train be assembled with great precision. When inserting a planetary axle into the carrier, the axle will sometimes become misaligned, causing the axle to hang up or jam in a crooked manner into a bore of the carrier. If not caught in inspection, this may lead to rework later on when the problem is discovered, which is undesirable. Regardless of when the problem is discovered, loss time and cost are incurred when fixing the problem.

FIG. 1 is a perspective view of a planetary gear train carrier member 102 as is known in the art. Upper large bores 104 and lower smaller bores 106 are provided that require precision machined inner cylindrical surfaces 108. Annular shaped thrust surfaces 110 that surround the perimeter of the lower bores 106 must also be precision machined. As already mentioned, these surfaces may become worn, requiring rework to enable the continued use of the carrier member. The large central bore 112 is for the shaft of the sun gear and the small core out holes 114 between the large upper bores 104 that surround the large central bore 112 are present to remove thick material portions of the carrier member 102, which may lead to undesirable manufacturing problems associated with sand casting such as sinks or porosity. The upper deck 116 is attached to the lower deck 118 by four standoffs 120 or rib like structures. As can be appreciated by looking at FIG. 1, the standoffs 120 form thick sections of the carrier member 102, necessitating the use of the core out holes 114. The upper deck 116, lower deck 118, skirt 122 and standoffs 120 define an interior annular groove 124 for the carrier member 102. The rim 126 of the carrier member 102 defines a plurality of mounting holes 128. Only two are shown for enhanced clarity, but it is to be understood that the array of mounting holes may extend about the periphery of the carrier member. Of features of the carrier member are also not shown for brevity.

FIG. 2 is a cross-sectional view of the planetary gear train 100 that is known in the art, showing a first step used in assembling the gear train 100 as the axle 130 is inserted through the upper large bore 104 of the carrier member 102 and begins to pass through the bore 132 of a bearing 134. As shown, the planetary gear 136 and bearings 134, 134' are disposed between the upper deck 116 and lower deck 118 of the carrier member 102. The two bearings 134, 134' have been inserted into the central aperture 138 of the planetary gear 136 and each bearing includes an inner race that also defines the central bore 132. The central bore 132 of the bearings 134, the central aperture 138 of the planetary gear 136, and the upper and lower bores 104, 106 of the carrier member 102 are all shown aligned concentrically, but in actuality, there may be misalignment between the bores of the carrier and those of the bearings as there is no positive method for alignment yet as the planetary gear and bearings are merely slid between the upper and lower deck before the insertion or pressing operation for the axle begins. In other words, the gear and the bearings are free to float relative to the carrier member along a radial direction R at this stage of the assembly process. As shown, the shaft portion 140 of the axle 130 is beginning to be inserted in to the bore 132 of the top bearing 134.

FIG. 3 shows step two of the assembly process depicted in FIG. 2 wherein the shaft 140 of the axle 130 has essentially passed through the bores 132, 132' of the two inner bearing races arranged in concentric fashion relative to each other. The bearings 134, 134' are adjacent each other along the longitudinal axis L of the rotational joint. As shown, the flange 142 of the axle 130 is about to engage the perimeter of the upper bore 104 of the carrier member 102 and the shaft 140 is about to engage the perimeter of the lower bore 106. It is at this point that misalignment may easily occur. Any of the embodiments discussed herein may use any suitable type of bearing, bushing, and/or method of lubrication that is already known or that will be devised in the art.

FIG. 4 illustrates the final step of assembling the axle 130 into the carrier member 102 wherein the flange 142 of the axle 130 is inserted into the upper bore 104 of the carrier member 102 and the shaft 140 of the axle 130 is inserted into the lower bore 106 of the carrier member 102. These insertion steps are usually accomplished using a pressing operation to overcome the friction inherent when press fitting one member into the aperture of another member. It is to be understood that that assembly operation may be completed as many times as needed. For example, four planetary gears may be provided using each of the pairs of large upper bores 104 and small lower bores 106 shown in FIG. 1. Though not shown in FIGS. 1 thru 4, a sun gear, located to the left of the planetary gear 136 in FIG. 4, would mesh with the planetary gear 136. Similarly, a ring gear would be disposed in the annular groove 124 shown to the right of the planetary gear 136 in FIG. 4 that meshes with the planetary gear.

One technique that has been used to complete this assembly process is visual alignment. The pressing operation used to insert the axle is performed until the flange of the axle is close to the large bore. The pressing operation is then stopped and realignment is performed visually. Then, the pressing operation is completed. This can be time consuming as an alignment window of only 1 mm is allowable using this method. It may take several iterations to use the visual alignment technique, which is undesirable.

Another technique has been referred to as the intentional misalignment technique. This technique involves forcing the components to one edge of the carrier until the main diameter of the planetary axle contacts the large bore. Then, the axle is pressed into the bearing races until the larger shoulder grounds into the top face of the carrier and deflects the top face. Next, the pressure is removed, allowing the deflected face of the upper deck to rebound resulting in the bearing and gear mass hanging suspended by the shoulder of the axle. Finally, the components are forced to the bore centerline. This causes the leading shoulder edge to drop into the large bore while the rest of the components are centered properly. Disadvantages of this method include increased assembly time, possible pinch points and damage to the face of the carrier when intentionally deflecting it using a press.

SUMMARY OF THE DISCLOSURE

A carrier subassembly for use with a planetary gear assembly is provided. The subassembly comprises a carrier member that defines at least one bore that defines an inner surface and a surface that surrounds the bore of the carrier member, a gear that defines a bore that is concentric with the bore of the carrier, the bore of the gear also defining an inner face, an axle that is operatively associated with the carrier member and the gear, and a sleeve that includes a cylindrical tube that defines a bore that is inserted into the bore of the carrier member, wherein the bore of the sleeve is concentric with the bore of the carrier member, and an end portion of the sleeve is proud compared to the surface surrounding the bore of the carrier member.

An assembly guide is provided. The assembly guide comprises a generally cylindrical body that defines a cylindrical axis, a radial direction, a first end, a second end, and a bore that extends from the first end to the second end along the cylindrical axis, wherein the first end includes a lead-in feature and the second end defines an alignment feature and the lead-in feature extends further in the outward radial direction than the alignment feature.

A method for assembling a carrier subassembly for use with a planetary gear train comprises inserting a gear so that the bore of the gear surrounds the bore of the carrier member, and aligning an assembly guide having a bore by engaging a portion of the assembly guide with an alignment feature of the carrier subassembly such that the bore of the assembly guide is aligned with the bore of the carrier member.

DETAILED DESCRIPTION

Figure 1:
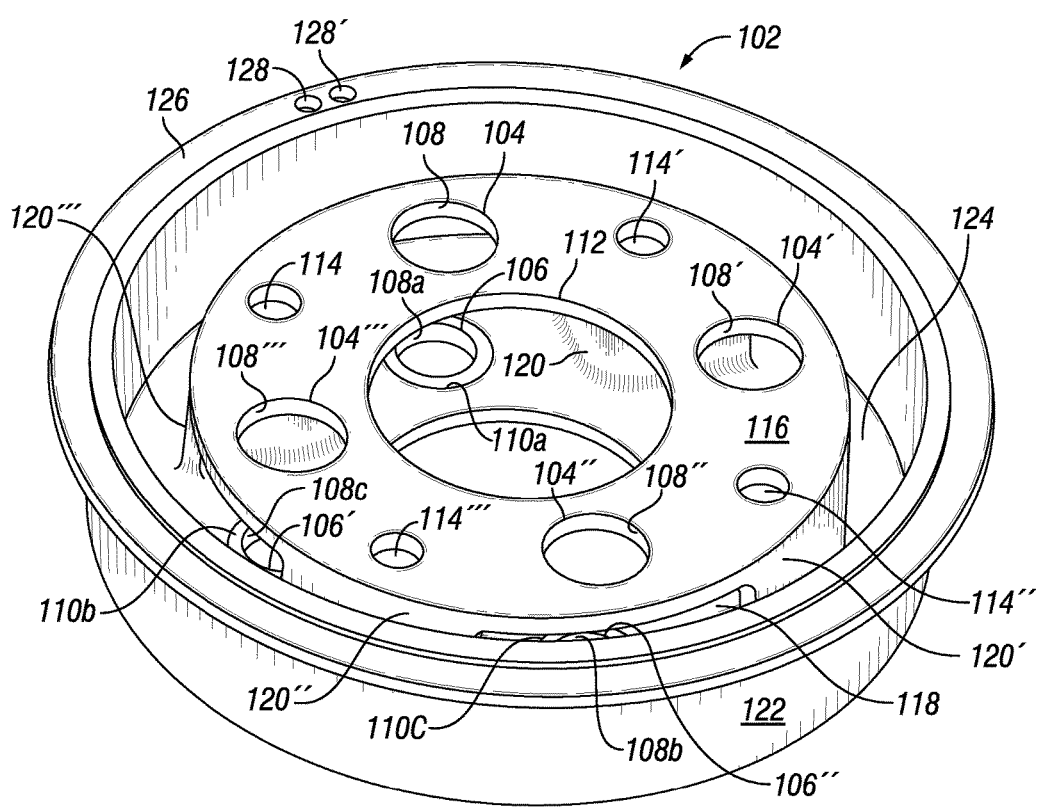
FIG. 1 is a perspective view of a planetary gear train carrier as is known in the art.
Figure 2:
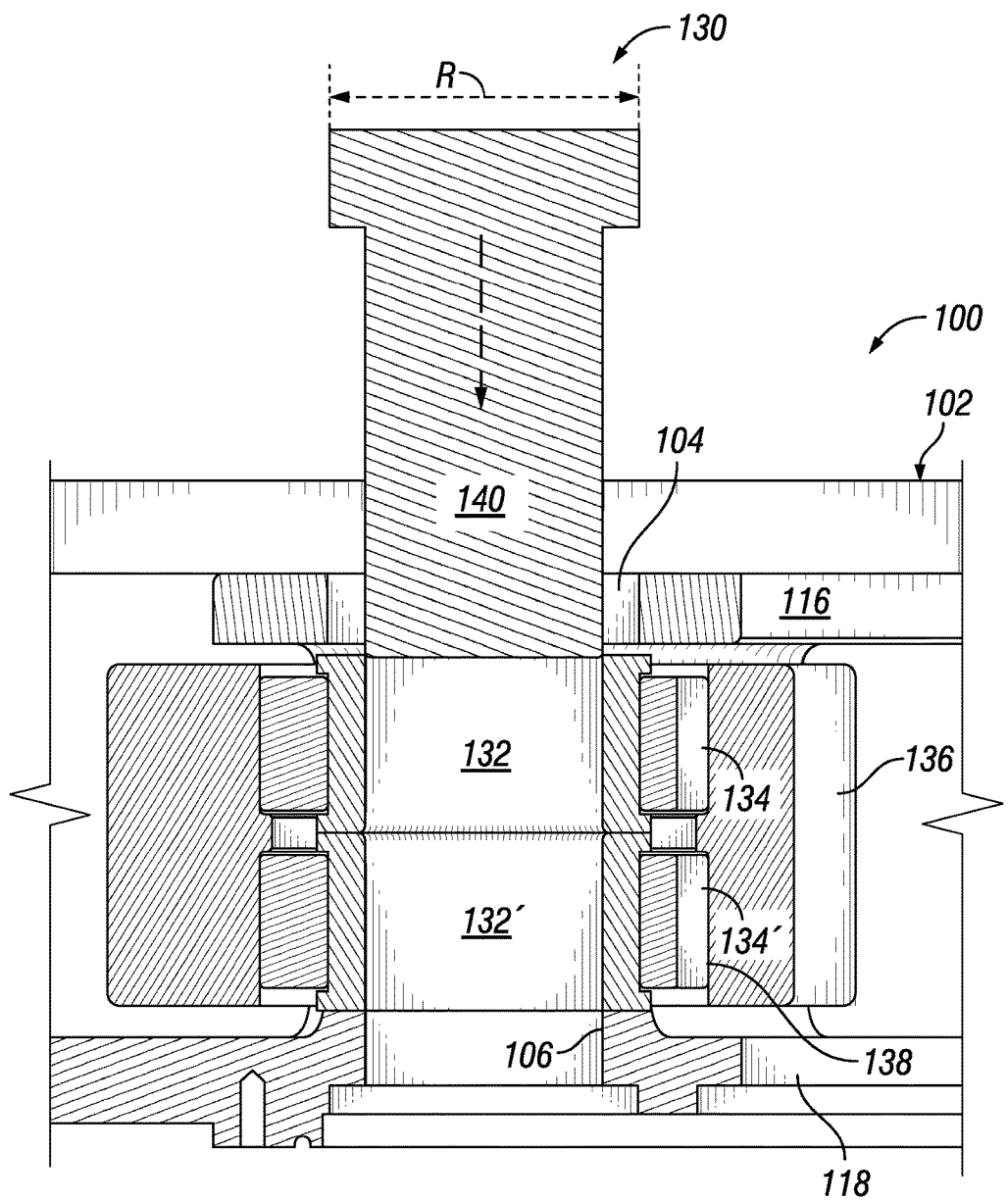
FIG. 2 is a cross-sectional view of a planetary gear train that is known in the art showing a first step used in assembling the gear train as the shaft is inserted through the bore of the carrier and begins to pass through the bore of a bearing race.
Figure 3:
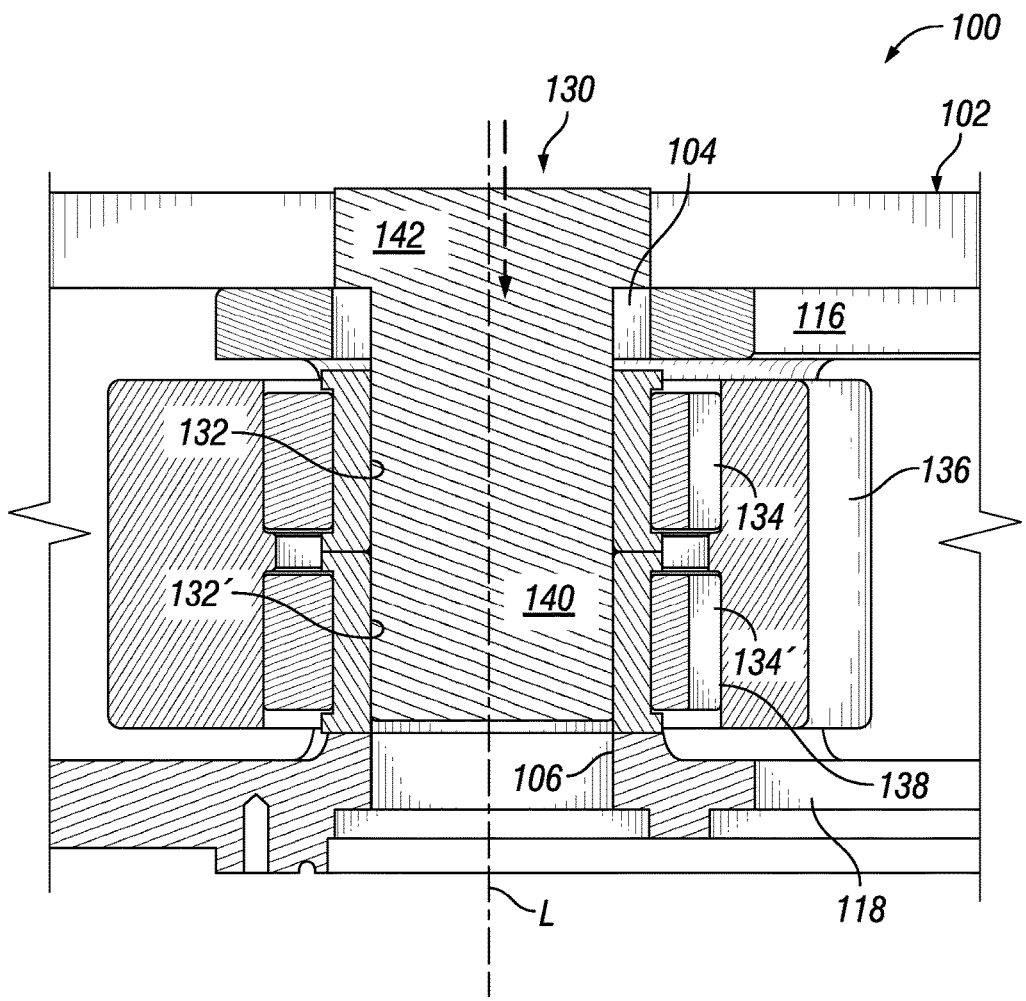
FIG. 3 shows step two of the assembly process depicted in FIG. 2 wherein the shaft has essentially passed through the bores of two bearing races arranged in concentric fashion adjacent each other.
Figure 4:
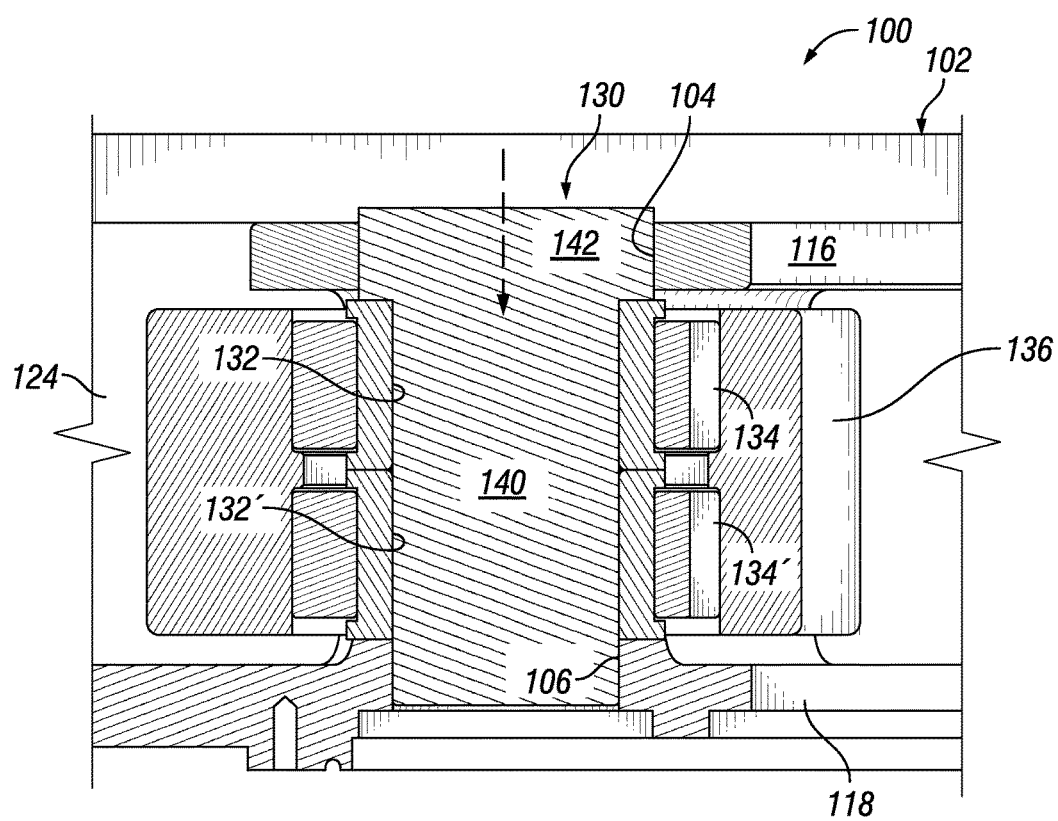
FIG. 4 illustrates the final step of assembling the shaft into the carrier where the flange of the shaft is inserted into the upper bore of the carrier and the body of the shaft is inserted into the lower bore of the carrier.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or a prime indicator such as 100', 100" etc. It is to be understood that the use of letters or primes immediately after a reference number indicates that these features are similarly shaped and have similar function as is often the case when geometry is mirrored about a plane of symmetry. For ease of explanation in this specification, letters or primes will often not be included herein but may be shown in the drawings to indicate duplications of features discussed within this written specification.

This disclosure provides an improved structure and method of assembly when remanufacturing or manufacturing carrier subassemblies used with planetary gear trains and the like. In some cases, worn out surfaces may be replaced. In other cases, simply the assembly time and the precision of the assembled rotational joint are improved.

Figure 5:
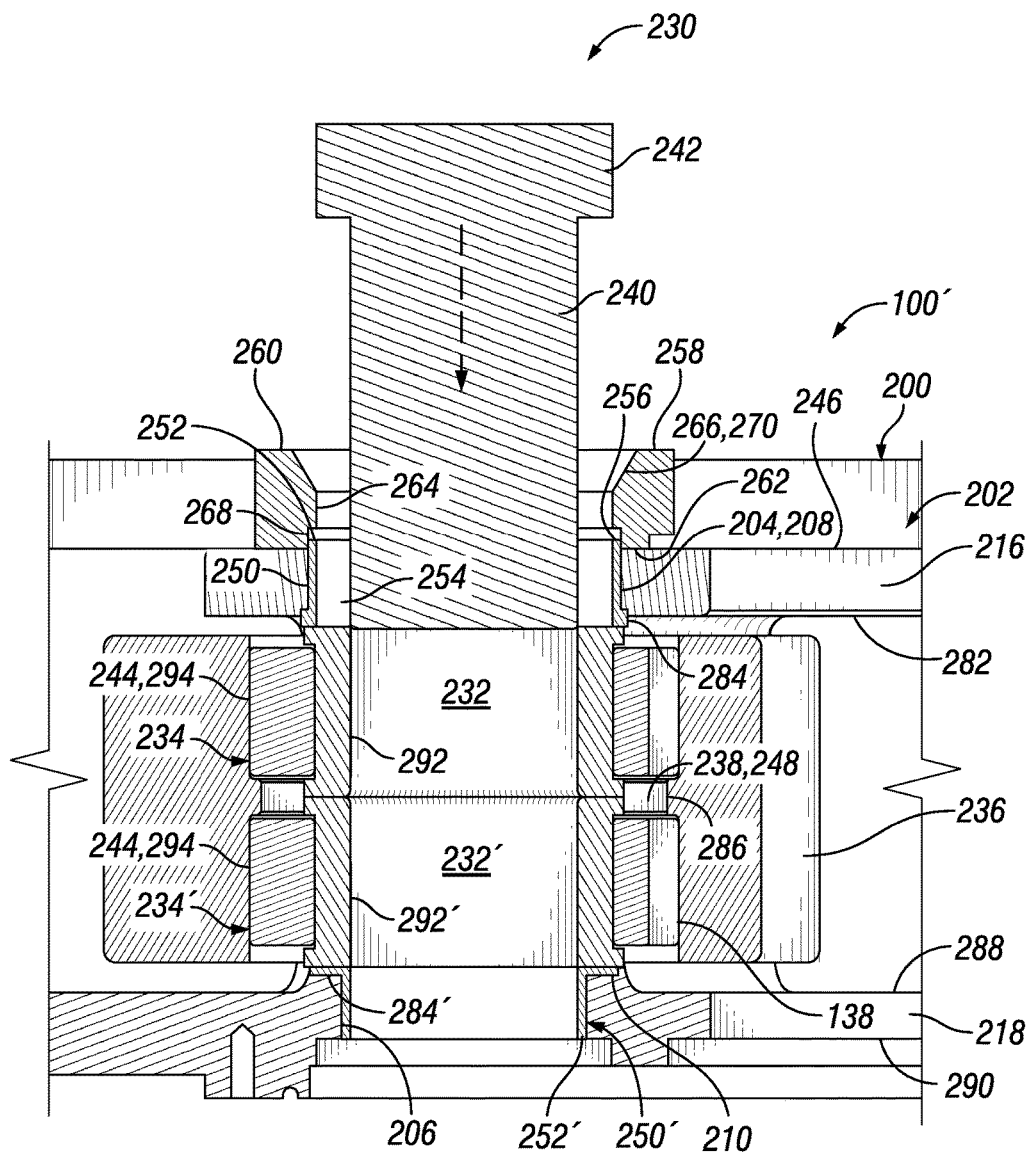
FIG. 5 is cross-sectional view of a planetary gear train that uses a sleeve and an assembly guide for attaching the shaft to the gear train according to an embodiment of the present disclosure. As shown, the first step of the assembly process involves starting to insert the body of the shaft into the bore of a first race bearing.

Looking now at FIG. 5, a carrier subassembly 200 for use with a planetary gear assembly 100' according to an embodiment of the present disclosure is shown. The carrier subassembly 200 may comprise a carrier member 202 that defines at least one bore 204 that defines an inner surface 208 and a surface 246 that surrounds the bore 204 of the carrier member 202. The subassembly 200 may further comprise a gear 236 that defines a bore 238 that is concentric with the bore 204 of the carrier member 202, the bore 238 of the gear 236 also defining an inner face 248. An axle 230 that is operatively associated with the carrier member 202 and the gear 236 is shown that allows the gear 236 to rotate relative to the carrier member 202. Also, a sleeve 250 is provided that includes a cylindrical tube 252 that defines a bore 254 that is inserted into the bore 204 of the carrier 202, wherein the bore 254 of the sleeve 250 is concentric with the bore 204 of the carrier 202, and an end portion 256 of the sleeve 250 is proud compared to the surface 246 surrounding the bore 204 of the carrier 202. This amount that the sleeve 250 protrudes past the upper surface 246 of the upper deck 216 of the carrier member 202 may range from 3-4 mm but this distance may be varied as needed or desired.

FIG. 5 also shows that an assembly guide 258, which defines a first end 260 and a second end 262 and an aperture 264 therethrough, may be provided. The first end 260 of the guide 260 defines a guide feature 266 that is configured to contact a portion of the axle 230 as the axle member 230 is inserted into the assembly guide 258 and the second end 262 of the guide 258 defines an alignment feature 268 that is configured to engage the proud portion 256 of the sleeve 250. The guide feature 266 may comprises any lead-in surface but is shown to be a chamfered surface 270 for this embodiment.

Figure 8:
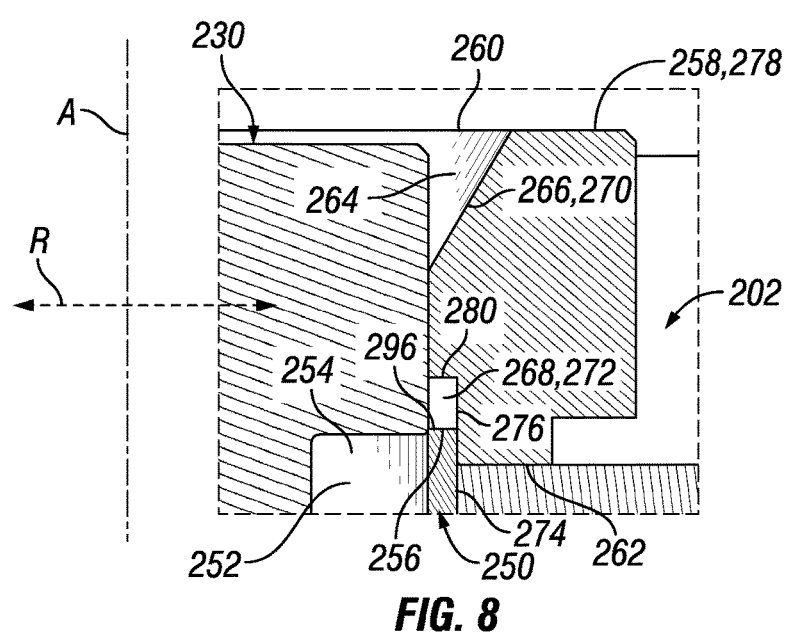
FIG. 8 is an enlarged detail view showing more clearly how the assembly guide is located by the upper sleeve, guiding the flange of the axle into engagement with the inner surface of the bore of the upper sleeve.

Looking at FIGS. 5 and 8 together, the alignment feature 268 is a pocket 272 defined by the second end 262 of the guide 258 that receives the proud portion 256 of the sleeve 250, wherein the proud portion 256 of the sleeve 250 defines an outer cylindrical surface 274 and the pocket 272 defines an inner surface 276 that is complimentary shaped to contact the outer cylindrical surface 274 of the sleeve 250, aligning the bore 254 of the sleeve 250 to the aperture 264 of the guide 258. The guide member 258 may be further characterized as having a generally cylindrical body 278 that defines a cylindrical axis A, a radial direction R, a first end 260, a second end 262, and a bore 264 that extends from the first end 260 to the second end 262 along the cylindrical axis A. As best seen in FIG. 8, the lead-in feature 266 extends further in the outward radial direction R than the alignment feature 268. The bottom 280 of the pocket 272 of the guide 258 is spaced away from the end portion 256 of the sleeve 250, providing clearance. The pocket 272 has a substantially rectangular configuration in the axial cross-section shown. Its width in the radial direction substantially matches the thickness of the cylindrical tube 252 of the sleeve 250 and may range from 2 to 4 mm. The height of the pocket, from end 262 of the guide member 258 to the bottom 280 of the pocket 272, measured along the cylindrical axis A, may range from 8 to 12 mm. Any of the dimensions or configurations of the guide member may be altered as needed or desired. A small chamfer or other lead-in feature 296 may be provided on the proud end 256 of the sleeve 250, which facilitates the placement of the assembly guide 258 onto the sleeve 250.

Focusing now on FIG. 5, the carrier member 202 includes an upper deck 216 with an upper surface 246 and a lower surface 282 and the bore 204 of the carrier is an upper bore 204 defined by the upper deck 216 passing through the upper surface 246 to the lower surface 282, and the sleeve 250 further comprises a flange 284 that extends from the cylindrical tube 252 and contacts the lower surface 282 of the upper deck 216. As a result, downward forced exerted on the axle 230 only serves to push the sleeve 250 downward onto the bearings 234, 234' and onto the lower sleeve 250' and the annular thrust surface 210 formed by flange 284' of that sleeve. To that end, the spacer ridge 286 provided on the interior of the gear 236 may be omitted to allow the downward force to press the upper sleeve 250, axle 230, bearings 234, 234' and lower sleeve 250' together. In such a case, the inner surface of the bore of the gear may be characterized as being continuous or uninterrupted from either longitudinal end of the gear.

In addition, the carrier member 202 includes a lower deck 218 with an upper surface 288 and a lower surface 290 and the bore 206 of the carrier member 202 is a lower bore 206 defined by the lower deck 218 passing through the upper surface 288 to the lower surface 290, and the lower sleeve 250' further comprises a flange 284' that extends from the cylindrical tube 252' and contacts the upper surface 288 of the lower deck 218.

Still looking at FIG. 5, the axle 230 includes a flange 242 and a shaft 240, the subassembly further comprising a bearing 234 or a bushing that defines a outer surface 244 and an inner surface 292 of the bore 232 wherein the outer surface 244 is configured to contact the inner surface 294 of the gear 236 and the inner surface 292 is configured to mate with shaft 240 of the axle 230.

For the embodiment shown in FIG. 5, two identical roller bearings are provided. Differently configured and/or styled bearings may be provided in other embodiments. In some embodiments, a bushing may be substituted for one or more bearings. Furthermore, the gear 236 is a planetary gear for this embodiment, but may be another type of gear in other embodiments.

Initially, the assembly process shown by FIG. 5 starts with the shaft 240 of the axle 230 contacting a chamfer of the top bearing 234, guiding the shaft 240 into the bore 232 of the bearing 234. Since an interference fit is usually provided, a pressing operation is typically used to force the shaft 240 of the axle 230 through the first bearing 234 and through the second bearing 234' in like manner until flange 242 of the axle 230 contacts or nearly contacts the chamfered surface 270 of the assembly guide 258.

Figure 6:
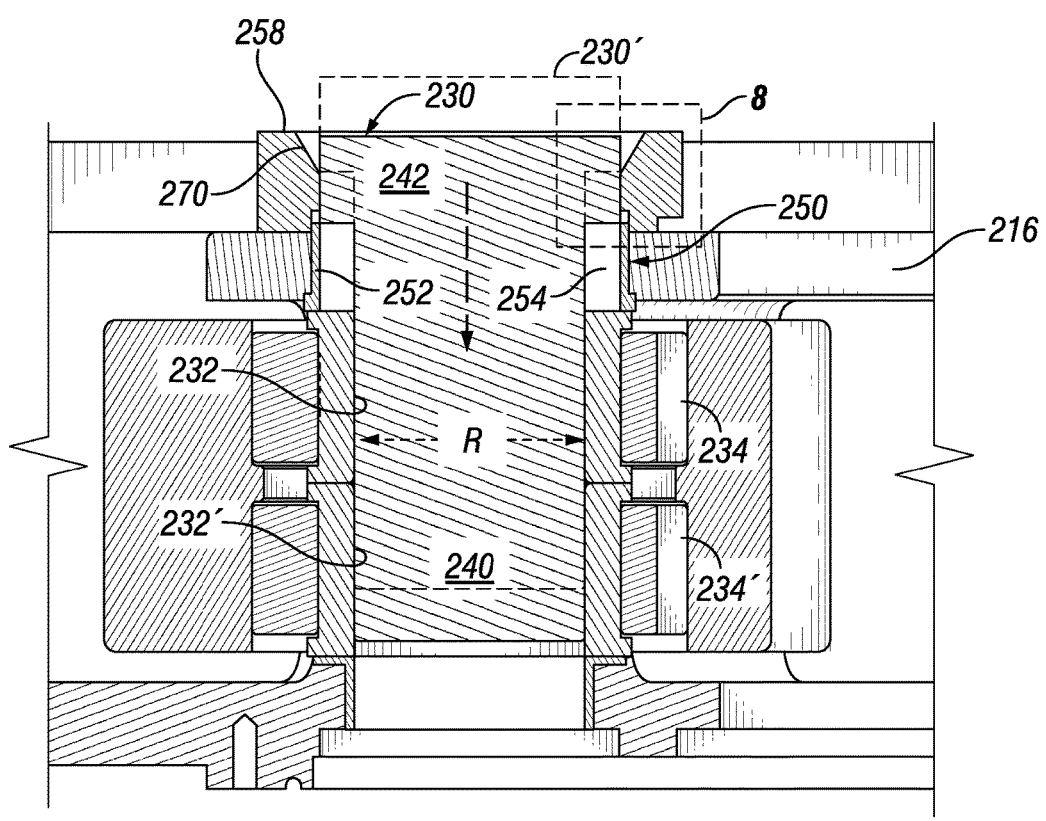
FIG. 6 illustrates step two of the assembly process of FIG. 5 where the body of the shaft has been inserted into the bore of the second bearing race and the flange engages the lead-in surface of the assembly guide.

Turning to FIG. 6, the use of the assembly guide 258 to align the axle 230 with the upper sleeve 250 can be seen. Initially, the axle 230 is misaligned with the bore 254 of the upper sleeve 250 such that its flange 242 contacts the chamfered surface 270 of the assembly guide 258, as illustrated by the dotted lines 230' in FIG. 6. The chamfered surface 270 directs or funnels the flange 242 of the axle 230 until it is in alignment with the bore 254 of the upper sleeve 250, at which point in time, the flange 242 contacts the cylindrical tube 252 of the upper sleeve 250. The movement of the axle 230 radially is imparted to the bearings 234, 234' through the shaft 240 of the axle 230, causing the bearings 234, 234' and their bores 232, 232' to also align with the bore 254 of the upper sleeve 250.

Figure 7:
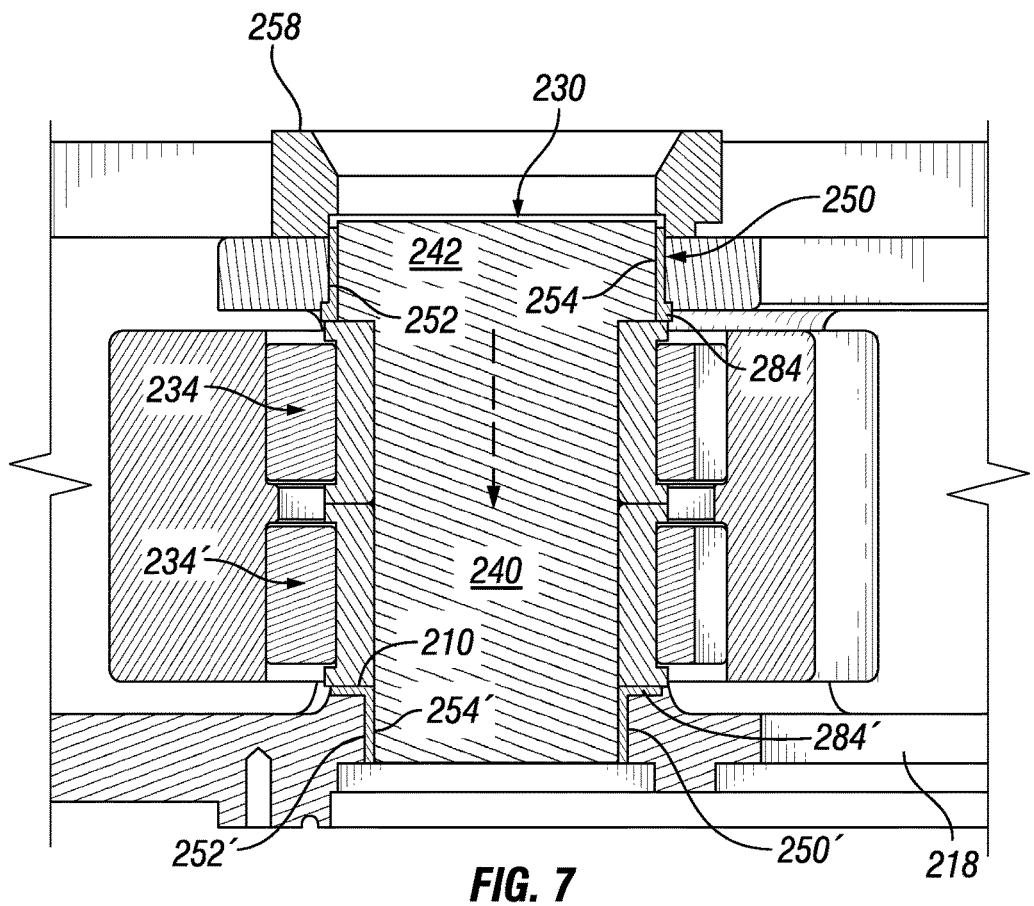
FIG. 7 depicts the third step of the assembly process where the body of the shaft has been inserted into the lower bore of the carrier and the flange of the shaft has been inserted into the bore of the sleeve.

As illustrated by FIG. 7, the pressing operation continues until the flange 242 of the axle 230 is fully inserted into the bore 254 of the cylindrical tube 252 of the upper sleeve 250 and the shaft 240 of the axle is fully inserted into the bore 254' of the cylindrical tube 252' of the lower sleeve 250'. The pressing operation continues until the flange 242 of the axle 230 presses down on the bearings 234, 234', providing a downward load or force that is exerted on the thrust surface 210 of the flange 284' of the lower sleeve 250' and the lower deck 218 underneath it.

INDUSTRIAL APPLICABILITY

In practice, an assembly guide as discussed herein may be manufactured, sold or bought to aid in the assembly of a carrier subassembly as described herein. This may be done in a remanufacturing or OEM context, that is to say, the carrier assembly and the assembly guide may be part of an assembly process and an apparatus associated with a new piece of equipment or with repairing or refurbishing an existing piece of equipment.

Figure 9:
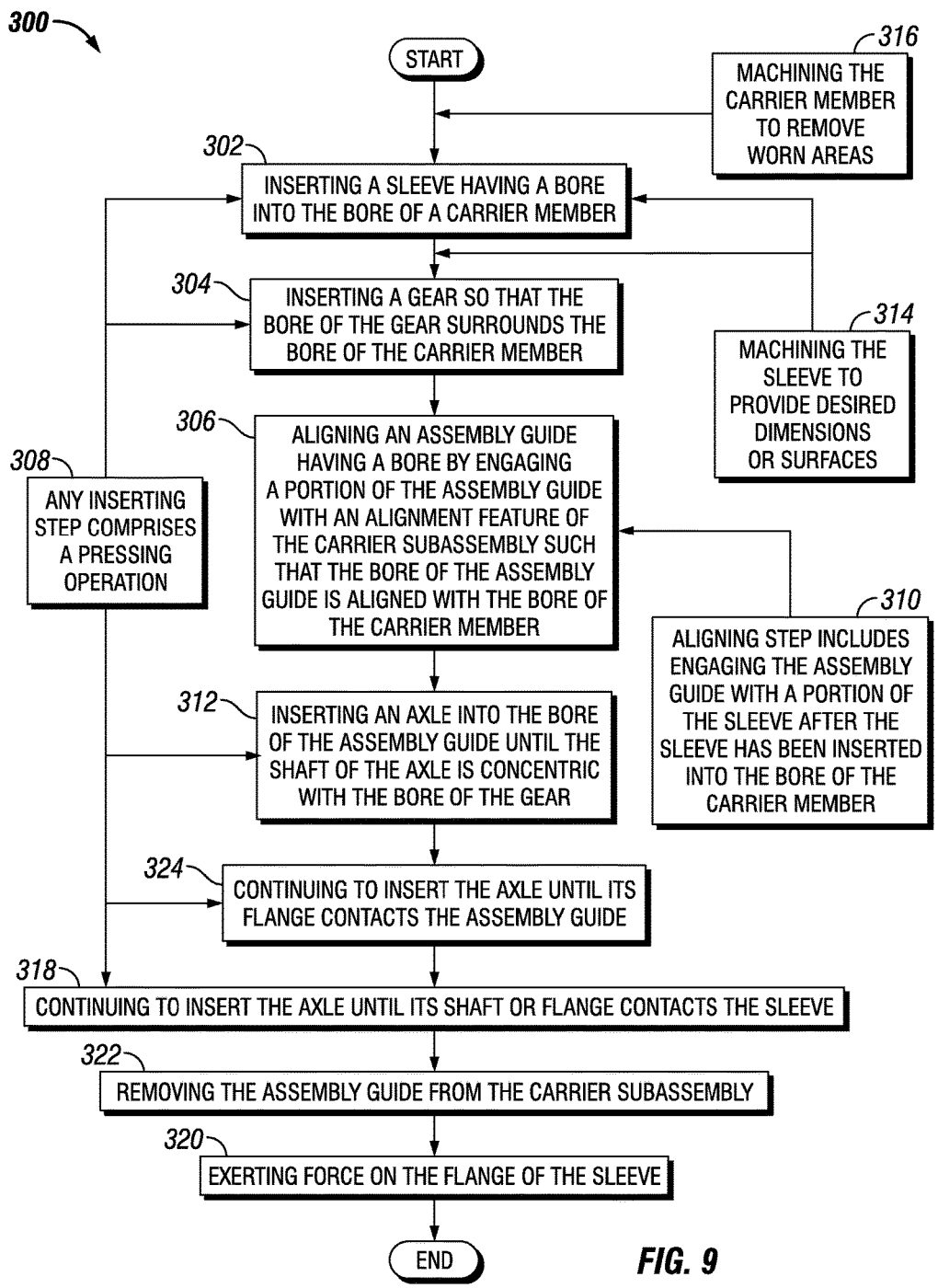
FIG. 9 is a flow chart illustrating a method for assembling a planetary gear train.

FIG. 9 is a flowchart that describes a method for assembling a carrier subassembly for use with a planetary gear train that is compatible with an assembly guide or carrier subassembly as described herein. The method 300 comprises inserting a sleeve having a bore into the bore of a carrier member (step 302), inserting a gear so that the bore of the gear surrounds the bore of the carrier member (step 304), and aligning an assembly guide having a bore by engaging a portion of the assembly guide with an alignment feature of the carrier subassembly such that the bore of the assembly guide is aligned with the bore of the carrier member (step 306).

Any of the inserting steps may comprise a pressing operation (step 308). The aligning step 306 may include engaging the assembly guide with a portion of the sleeve after the sleeve has been inserted into the bore of the carrier member (step 310). In other embodiments, the aligning step 306 may include engaging a plurality of other bores or other datums of the carrier subassembly so that the bore of the assembly guide is aligned with the bore of the carrier member.

The method may further comprise inserting an axle into the bore of the assembly guide until the shaft of the axle is concentric with the bore of the gear (step 312). In some embodiments, the sleeve is machined to provide desired dimensions or surfaces (step 314) prior to inserting the axle. For example, the thrust surface or inner bore surface of the sleeve may be machined to provide a desired dimension and/or surface finish, etc. Prior to inserting the sleeve into the carrier member (step 302), the bore and/or thrust surface of the carrier member may be machined to remove worn areas (step 316) prior to inserting the sleeve so that machining the sleeve effectively replaces the dimensions and surface finishes of the carrier member that were present when the carrier member was new.

When a press fit is desired or needed between the carrier member and a sleeve, a hydraulic cylinder may be inserted between the upper and lower deck of the carrier member so that the hydraulic cylinder may contact either an upper or lower sleeve and the opposite upper or lower deck. The hydraulic cylinder may then be activated until the sleeve is pressed into the carrier member. Alternatively, a draw stud may be inserted through the upper and lower deck and sleeve associated therewith with a nut on one side of the deck and a nut that is then threaded onto the free end of the stud. Tightening the nut opposite of the nut threaded on the free end of the draw stud will cause the draw stud and nut to move away from the interior of the carrier member, pressing onto the sleeve and pressing the sleeve into the carrier member.

The method may further comprise continuing to insert the axle until its flange contacts the assembly guide (step 324) and continuing to insert the axle until its shaft or flange contacts the sleeve (step 318). A pressing operation may be utilized to exert force on the flange of the sleeve (step 320). At any time after the flange engages a sleeve, the assembly guide may be removed from the carrier subassembly as its function has been satisfied (step 322).

The materials of any of the components discussed herein, such as the sleeve and assembly guide, may use steel, or any metal or other suitably durable material.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the disclosure(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A carrier subassembly for use with a planetary gear assembly, the subassembly comprising:
   a carrier member that defines a first bore that defines an inner surface and a surface that surrounds the first bore;
   a gear that defines a second bore that is concentric with the first bore,
   the second bore also defining an inner face;
   an axle that is operatively associated with the carrier member and the gear;
   a sleeve that includes a cylindrical tube that defines a third bore that is inserted into the first bore, wherein the third bore is concentric with the first, and an end portion of the sleeve is proud compared to the surface surrounding the first bore; and
   an assembly guide that defines a first end and a second end and an aperture therethrough, wherein the first end of the guide defines a guide feature that is configured to contact a portion of the axle as the axle is inserted into the assembly guide and the second end of the guide defines an alignment feature that is configured to engage the proud portion of the sleeve.

2. The subassembly of claim 1 wherein the guide feature comprises a chamfered surface.

3. The subassembly of claim 1 wherein the alignment feature is a pocket defined by the second end of the guide that receives the proud portion of the sleeve, wherein the proud portion of the sleeve defines an outer cylindrical surface and the pocket defines an inner surface that is complimentary shaped to contact the outer cylindrical surface of the sleeve, aligning the third bore to the aperture of the guide.

4. The subassembly of claim 1 wherein the carrier member includes an upper deck with an upper surface and a lower surface and the first bore is an upper bore defined by the upper deck passing through the upper surface to the lower surface, and the sleeve further comprises a flange that extends from the cylindrical tube and contacts the lower surface of the upper deck.

5. The subassembly of claim 1 wherein the carrier member includes a lower deck with an upper surface and a lower surface and the first bore is a lower bore defined by the lower deck passing through the upper surface to the lower surface, and the sleeve further comprises a flange that extends from the cylindrical tube and contacts the upper surface of the lower deck.

6. The subassembly of claim 1 wherein the axle defines a flange and a shaft, the subassembly further comprising a bearing or a bushing that defines an outer surface and an inner surface wherein the outer surface is configured to contact the inner surface of the gear and the inner surface is configured to mate with shaft of the axle.

7. The subassembly of claim 6 wherein the bearing or bushing is a roller bearing.

8. The subassembly of claim 7 further comprising a second bearing that is identical to the first bearing.

9. The subassembly of claim 8 wherein the gear is a planetary gear.

\* \* \* \* \*